INVENTOR
DAVID R. CAMPBELL

Francis A. Painter
ATTORNEY

United States Patent Office 3,646,188
Patented Feb. 29, 1972

3,646,188
PROCESS FOR IMPROVING UNIFORMITY OF POLYMERIC FILM
David Robert Campbell, Florence, S.C., assignor to E. I. du Pont de Nemours and Company, Wilmington, Del.
Continuation-in-part of application Ser. No. 775,328, Nov. 13, 1968. This application Feb. 3, 1970, Ser. No. 8,419
Int. Cl. B29c 25/00
U.S. Cl. 264—230                        7 Claims

ABSTRACT OF THE DISCLOSURE

Improving the uniformity of latent shrinkage in an oriented, heat-set polyethylene terephthalate film by heating those portions of the film having higher latent shrinkage to a higher temperature while holding the film between restraint and minimum relaxation. Optical sensing means are used in conjunction with radiant heaters on a continuous length of film.

CROSS-REFERENCE TO RELATED APPLICATION

This application is a continuation-in-part of my copending application Ser. No. 775,328, filed Nov. 13, 1968, now abandoned.

BACKGROUND OF THE INVENTION

This invention relates to improving the properties of oriented, heat-set polyethylene terephthalate film and, more particularly, to the improvement in the uniformity of latent shrinkage characteristics of such film.

Films of the highest level of tensile strength are produced by stretching to effect molecular orientation, but upon heating an oriented film, extended molecular chains tend to retract, resulting in shrinkage of the film. This residual shrinkage tendency is normally eliminated by heating the film to a temperature above its orientation temperature, preferably above the highest temperature expected in use. This heating may be done while holding the film under restraint, in which the process is called "heat setting," or it may be done while permitting the film to shrink a very small degree, in which it is called "relaxation."

Presently, the most widely used methods of production of biaxially-oriented polyethylene terephthalate film employ a process of stretching the film sequentially. One method is by first stretching in the longitudinal direction, i.e., in the direction of extrusion, by means of a system of progressively faster rolls, and then stretching in the transverse direction by means of edge gripping clips mounted on diverging chains in a heated oven. This sequence of stretching is capable of producing film of satisfactory quality, but is severely limited by the maximum operable speeds of the transverse stretching apparatus, the tenter frame. The longitudinal stretching step elongates the film web, for example, three times its initial length, which means the speed of the film through the tentering apparatus must be three times as great as the initial speed of the web. The windup apparatus could accommodate this speed, but the mechanical nature of tentering apparatus makes high speeds dangereous as well as impractical. An alternative process, known as reverse-sequence stretching, in which the transverse stretching is accomplished initially, while the linear web speed is still low, followed by longitudinal stretching which is speed-increasing, provides a means to obviate the speed limitation of the tenter frame. This process is described in Winter, U.S. Pat. 2,995,779, issued Aug. 15, 1961.

Certain problems are noted with the films produced, especially in the reverse-sequence method. It has been found that, in film produced by the latter method with heat setting and relaxation of the film accomplished by contact with heated rolls, there is an appreciable difference in dimensional stability (i.e., shrinkage) between the center and the edges of the sheet, a characteristic commonly called "bow." Attempts to eliminate bow by carefully controlled heating with rolls to achieve uniformity of heat setting or relaxation have been fruitless.

In certain industries such as magnetic tape, cartography, drafting or lithography, coatings are applied to the film, and in the course of drying these coatings in heated towers the heat of these towers, even though carefully controlled, can cause small degrees of shrinkage which, if non-uniform, produces wrinkles and other undesirable or even fatal deficiencies in the film for its intended use.

Although the prior art teaches the use of separately controllable heaters to heat selected portions of a sheet before and during stretching to change the polymer flow properties during the application of stretching forces, a greater or lesser amount of heat is applied according to the desirability of increasing or decreasing thickness to obtain a flat sheet. Nothing in the art suggests the elimination of bow by non-uniform heating during heat setting or relaxation.

SUMMARY OF THE INVENTION

It has been found that the uniformity of latent shrinkage characteristics of oriented, heat-set polyethylene terephthalate film can be improved by passing the film through a radiant-heating zone wherein portions of the film having the higher latent shrinkage are heated to a higher temperature while said film is tensioned between restraint and minimum relaxation.

DETAILED DESCRIPTION OF THE INVENTION

Figure 1:
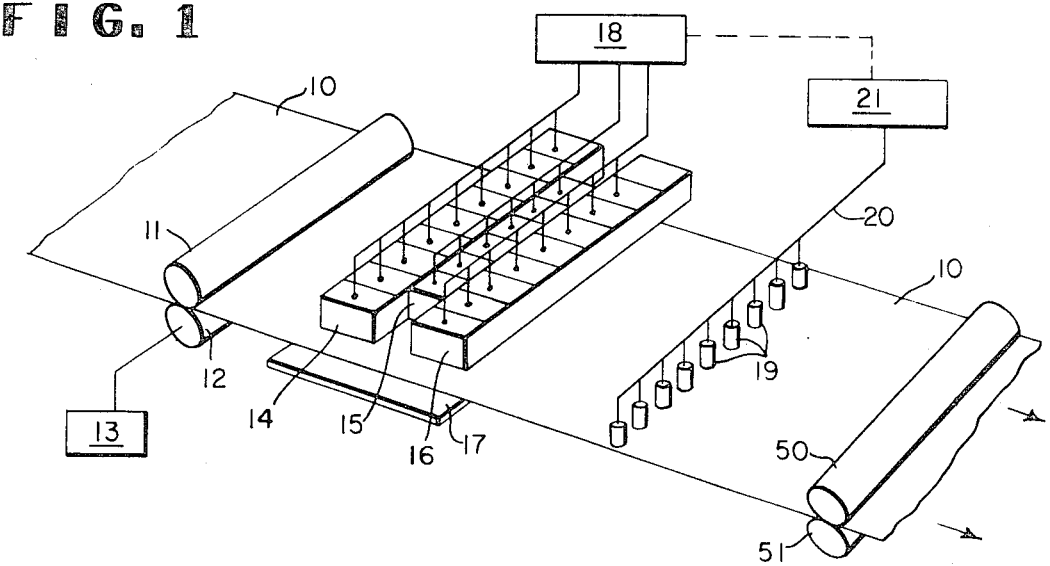
FIG. 1 is a schematic isometric view of the apparatus employed in carrying out this invention.

The present invention is particularly adapted to the production of biaxially-oriented polyethylene terephthalate film, and more particularly to the production of such film by the reverse-sequence stretching method, where the film is stretched first in the TD (transverse direction, i.e., in the plane of the film perpendicular to the direction of extrusion), and then in the MD (machine direction, i.e., parallel to the direction of extrusion). In its preferred use it is employed in a continuous, integrated process involving polymerization, casting, stretching, and heat treatment (heat setting or relaxation), but it may be employed on an off-line relaxer with appropriate modifications to correspond to the location of the bow in the sheet. The processes of polymerization, extrusion, orientation and heat setting are now well known in the art and will not be repeated here. The teachings of Winter, U.S. Pat. 2,995,779, are incorporated herein by reference.

A film typically produced by the above-described reverse-sequence process is stretched in the TD at a temperature between 80–90° C. and then in the MD at a temperature between 90 and 160° C. The film is then heat set where the orientation is "locked in" by further crystallization of the film by passing the film over heated rolls at 135 to 250° C. It may be preferred to employ two successive heat-setting rolls. If the film is quenched at 25° C. and isolated at this point, it will be found to exhibit greater latent shrinkage characteristics in the center than near the edges. If such a film sheet were relaxed to its maximum, the center would shrink much more than the edges and the initially flat sheet would be baggy at the edges. It is with such films that the improvement of the instant invention is applied.

Referring now more particularly to the drawing, a film 10 to be subjected to the process of this invention is advanced between a pair of rollers 11 and 12. The latter can be supplied with cooling means symbolically indicated at 13, well known to those skilled in the art, for the purposes of quenching the film 10 if the film has come from a heat-setting operation. The film then passes beneath three banks of radiant-heating devices 14, 15 and 16. It is well within the skill of the art to use more or fewer banks than the three illustrated. On the opposite side of the film from the radiant-heating devices is positioned a reflector 17 having a highly reflective surface to provide for efficient heating. The heating devices are powered from suitable sources 18 which will be more fully described hereinafter. As the film advances through the radiant-heating zone, it passes beneath a series of transversely placed optical temperature-sensing probes 19. Suitable for such use are the Barnes "Optitherms" made by Barnes Engineering Company. These are individually coupled through multiconductor cable 20 to a panel 21 which provides for a visual readout of film temperatures in respective heated lanes.

The radiant-heating devices in banks 14, 15 and 16 are positioned so as to supply a uniform gradient of heat across the width of film sheet 10. Suitable heaters are electrical resistance heaters behind quartz panels, each unit being a 12-inch x 14-inch panel rated at 3.36 kw. (manufactured by Hugo N. Cahman Associates, Inc.). Preferably, they are positioned, with the 14-inch dimension running in the TD, at a distance of about eight to twelve inches from the surface of the film such that the plane of the heater surface is parallel to the plane of the film. A uniform thermal gradient can be provided, for example, by positioning nine heaters in banks 14 and 16 with six heaters in intermediate bank 15. These can be arranged so that the joints between separate heaters in the outer rows 14 and 16 are overlapped by heater units of the inner row 15. In addition, the heating elements in banks 14 and 16 can be offset slightly so that the joints are not on the same parallel line. Another satisfactory arrangement, however, can consist of five banks of nine heaters each arranged without overlapping or offset.

Figure 2:
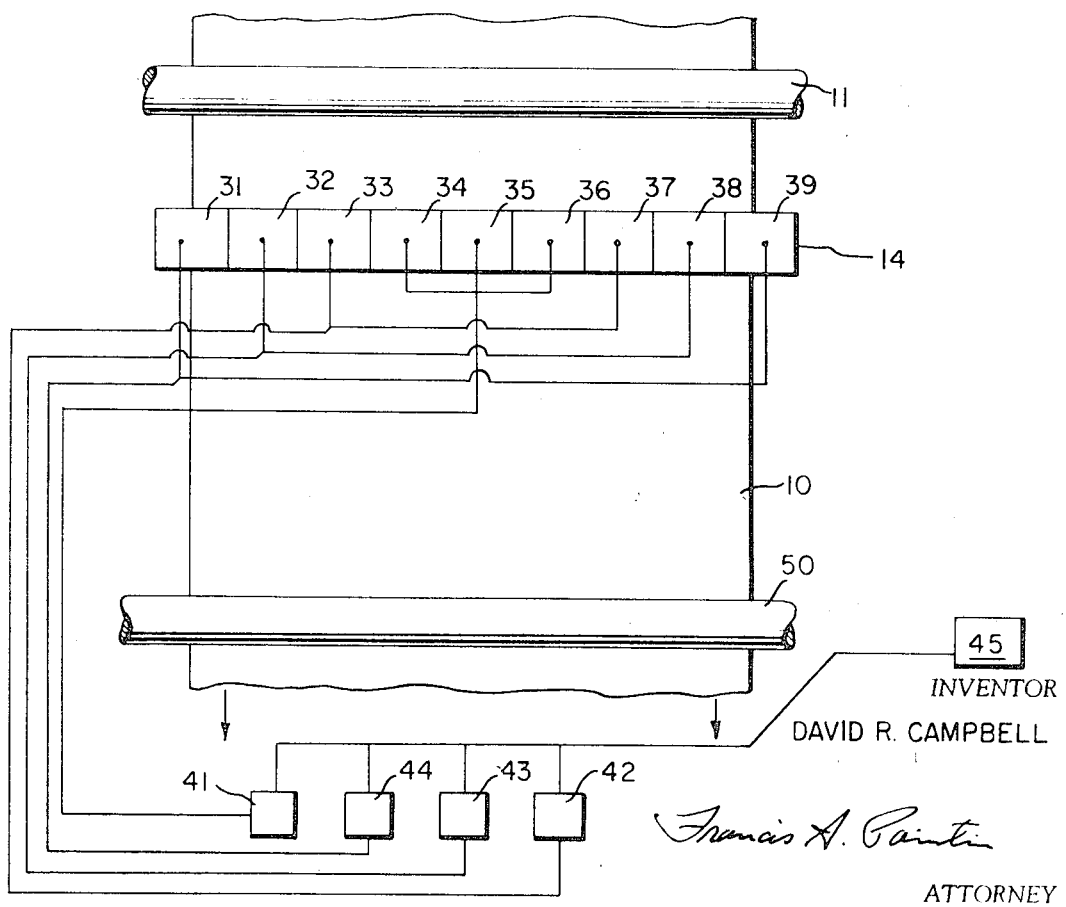
FIG. 2 is a schematic plan view of the part of the apparatus depicted in FIG. 1 which emphasizes the wiring of the individual heating elements.

The individual heating units are arranged and power is supplied thereto so that the film temperature profile is generally symmetrical about the center of the film. Referring more particularly to FIG. 2, heaters 31 through 39 are shown arranged in bank 14. The center heaters 34, 35 and 36 are interconnected to the same power source 41 and thus will be held at about the same temperature. Heaters 33 and 37 are connected to power source 42 and will be held at a somewhat lower temperature than center heaters 34, 35 and 36. Accordingly, pairs of heaters 32, 38 and 31, 39 are connected to power sources 43 and 44, respectively, with the latter being held at the lowest temperature. The output of power sources 41, 42, 43 and 44 is suitably controlled by auto transformers and powered by line power 45. In a like manner, the heaters of banks 15 and 16 can be wired and controlled so that a desired temperature gradient across the film, symmetrical to the center of the film, is achieved.

The optical temperature-sensing probes 19 will reveal the effects of the heating means described hereinabove by sensing the film temperature profile. An operator may control the heaters manually, responsive to visual readouts 21, or conventional instrumentation may be employed to sense the signals produced from the probes 19 and employ the signals to control the various power sources such as 41–44.

The film 10 ultimately passes between rollers 50 and 51 and from there the film can be sent on for further processing or windup as is desired. The speeds of rollers 11, 12 and 50, 51 are such that the film is tensioned between restraint and minimum relaxation. For the purposes of this invention, "restraint" means that the linear speeds of rollers 50 and 51 are the same as rollers 11 and 12 and the film is not permitted to be drawn even ever so slightly by the second pair of rollers becoming faster than the first. The term "minimum relaxation" in connection with this invention means that the rollers 50 and 51 are driven at a speed sufficiently slower than rollers 11 and 12 that a relaxation is permitted equal to the smallest shrinkage value across the cross section of the film. For example, if the latent shrinkage near the center of the film is about 1.5% while the latent shrinkage near the edges of the film is about 1%, minimum relaxation means permitting the film to relax or shrink not greater than 1%. In this way, flatness in the film sheet is maintained.

The temperatures to be employed in conducting this invention should permit the maximum temperature difference between the center and the edges of the film. The practical limits are established by the minimum temperature at the edges required to effect relaxation, i.e., temperatures that are too low do not allow removal of residual shrinkage. Under some operating conditions, temperatures between about 70 and 90° C. are suitable near the edge of the film. The temperatures near the center of the film must first of all be below the melt temperature of about 245° C. and will usually be below 200° C. Ordinarily, however, the temperature at the center should be above about 100° C. The temperature differential between the center and the edges will usually be at least about 10 centigrade degrees; however, differentials of at least 20 degrees may be preferred. The particular temperature selected for the center portion of the film will usually be governed by the ultimate use to be made of the film and will ordinarily be somewhat higher than the expected use temperature.

The invention will now be described in connection with a specific example thereof.

EXAMPLE

An oriented polyethylene terephthalate film is prepared in accordance with Winter, U.S. Pat. 2,995,779. The profiled radiant heat treatment of the present invention is applied to nominally 0.001-inch thick films made as follows:

Rate: 900 lbs./hr.
TD stretch: 3.75×
MD stretch: 4.64×
Heat-set temperature: 188° C.
Quench temperature: 25° C.
Relaxation: 194 feet/minute film speed at windup, 0.015 minute (less than 0.5%)

The film temperature profile is adjusted by varying the voltage to the radiant heaters equipped with adjustable auto transformers. The center of the film is heated to about 100° C. and edges are heated to about 74° C. Typical properties measured at 105° C. indicate that the dimensional stability in the center of the film has a typical latent shrinkage value of about 1.6 to 1.7, whereas the edges of the film have a typical shrinkage value of about 0.95. The bow value (the difference in shrinkage between the center and the edges) is typically about 0.73. If, however, contrary to this invention, the film were relaxed under conditions wherein the temperatures at the center and the edges had been about the same, the typical bow value would be as high as about 1.0; and, if the temperature of the edges had been maintained at about 87° C., while the center was maintained at only about 72° C., the magnitude of the bow would be typically about 1.05%. As can be seen, this improvement does not always entirely eliminate bow but it does reduce its magnitude.

In the processing of polyethylene terephthalate film of about 118 inches in width, prepared and otherwise processed in accordance with the example above, wherein the center portion is to be heated to about 130° C. and the edges heated to about 110° C. using five non-offset banks of heaters (9 heaters per bank), basic data calculations indicate the following:

| Nominal film thickness (inches ×10⁻⁵) | Maximum throughput (lbs./hr.) | Corresponding windup speed (yards/min.) |
|---|---|---|
| 25 | 830 | 220 |
| 50 | 1,250 | 165 |
| 75 | 1,420 | 125 |
| 100 | 1,480 | 110 |
| 150 | 1,610 | 75 |

This invention is particularly advantageous in use on any polyethylene terephthalate film wherein the final stretching step is conducted by rolls and, thus, can also be used even on unidirectionally oriented film.

While the description herein relates particularly to the use of this invention on a polyethylene terephthalate film which was previously heat set, it is possible to subject the film to the profiled radiant-heat treatment of this invention before heat setting. In such a procedure, the film after leaving the machine-direction stretching step is passed through the radiant-heating zone wherein portions of the film having the higher latent shrinkage are heated to a higher temperature while the film is tensioned between restraint and minimum relaxation all as indicated hereinabove. Thereafter, the film, if desired, can be passed into a heat-setting step such as is well known to those skilled in the art. A still further possibility is to accomplish heat setting of the film simultaneously with the profiled radiant-heat treatment of this invention. In such a procedure, the lowest temperature in the radiant-heating zone is maintained high enough to accomplish the heat setting of the film as may be desired, e.g., 150° C. The higher temperatures in the zone are directed at the portions of the film having the higher latent shrinkage. In such a case, no further heat setting of the film may be necessary.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. A process for the improvement of the uniformity of latent shrinkage characteristics of oriented, heat-set polyethylene terephthalate film, portions of which prior to improvement by this process have a higher latent shrinkage than other portions across the width of said film, which improvement comprises passing the film through a radiant-heating zone wherein the portions of the film having the higher latent shrinkage are heated to a higher temperature while said film is tensioned between restraint and minimum relaxation, the lowest temperature in said zone being a temperature sufficient to effect relaxation on the portion exposed thereto and the highest temperature being below the melt temperature of said film.

2. A process as defined in claim 1 wherein the film is heat-set prior to the step of passing said film through said radiant-heating zone.

3. A process as defined in claim 1 wherein the film is heat-set after the step of passing said film through said radiant-heating zone.

4. A process as defined in claim 2 wherein the lowest temperature is at least 10 centigrade degrees lower than the highest temperature.

5. A process as defined in claim 2 wherein the temperatures are set within said zone such that the higher temperatures are near the center of the film width.

6. A process as defined in claim 5 wherein the center of the zone is heated to a temperature of between about 100 and 200° C. with the temperatures of said zone descending to the portions near the film edges where the temperatures are at least 10 centigrade degrees lower than the center temperature.

7. A process as defined in claim 2 wherein said film is oriented by first stretching in the transverse direction followed by stretching in the machine direction.

References Cited
UNITED STATES PATENTS

| 2,339,451 | 1/1944 | Bailey et al. | 18—12 |
| 2,995,779 | 8/1961 | Winter | 264—289 |
| 3,000,057 | 9/1961 | Swedlow et al. | 264—230 |
| 3,161,711 | 12/1964 | Tassler | 264—289 |

FOREIGN PATENTS

| 761,075 | 11/1956 | Great Britain | 264—342 |

ROBERT F. WHITE, Primary Examiner

G. AUVILLE, Assistant Examiner

U.S. Cl. X.R.

264—25, 40, 235, 289, 342 RE, 346